UNITED STATES PATENT OFFICE.

FREDERICK W. HOCHSTETTER, OF NEW YORK, N. Y., ASSIGNOR TO H. P. PATENTS AND PROCESSES COMPANY, INC., A CORPORATION OF NEW YORK.

COMPOSITION OF MATTER FOR DEVELOPING AND FIXING PHOTOGRAPHIC EXPOSURES.

1,207,042.     Specification of Letters Patent.     Patented Dec. 5, 1916.

No Drawing.     Application filed October 7, 1913. Serial No. 793,891.

*To all whom it may concern:*

Be it known that I, FREDERICK W. HOCHSTETTER, a subject of the Emperor of Germany, and a resident of New York, county and State of New York, have invented a certain new and useful Composition of Matter for Developing and Fixing Photographic Exposures, of which the following is a full, clear, and exact specification.

This invention relates to a class of compositions adapted to be used for producing photographic pictures.

My invention has for its object primarily to provide a composition of matter designed to be used for permitting the negatives of picture films to be produced consecutively with the exposures of the film when photographing living objects or scenery, and which is especially adapted to enable a series of photographs of moving objects to be quickly made, the composition being used preferably by saturating a strip of absorbent material which is arranged in the camera or similar photographic apparatus utilized for making the exposures of the sensitized film, whereby the exposures will be developed into negatives for permitting a number of pictures to be made therefrom, or if desired the exposures may be developed into positives so that the pictures may be exhibited without requiring the exposures to be treated by the customary processes which ordinarily necessitate the employment of various appliances and chemicals, thereby permitting a person particularly when unskilled in the art of photography to readily produce photographic pictures.

My composition of matter consists of the following ingredients, combined in the proportions stated, viz:—

Solution No. 1: Developing agent, such as hydroquinone, metol, adurol, amidol, glycin, edinol, kachin, or other similar agents, 150 grains; sodium sulfite, 75 grains; hot water, by measure, 10 ounces; glycerin, by measure, 15 ounces.

Solution No. 2: Alkali carbonate such as potassium carbonate, 75 grains; water, by measure, 10 ounces; glycerin, by measure, 15 ounces.

Solution No. 3: Sodium hyposulfite, 240 grains; water, by measure, 10 ounces.

To the ten ounces of hot water contained in a suitable receptacle is added the hydroquinone, and the mixture is agitated until the hydroquinone is dissolved. The sodium sulfite is then dissolved in this solution, and the glycerin is afterward incorporated therein. This mixture serves as stock solution number one, and may be retained in a tightly closed bottle, or the like so as to be used as occasion requires.

Solution number two is made by dissolving the potassium carbonate or other suitable alkali carbonate in ten ounces of cold water contained preferably in a suitable bottle, and fifteen ounces (by measure) of glycerin is then added thereto. After these ingredients are thoroughly mixed the bottle is closed so as to be air-tight for also serving as stock solution.

Solution number three is made by placing ten ounces of water in a bottle or other suitable receptacle, and then dissolving by agitation the sodium hyposulfite in the water. Still another stock solution is formed by this mixture.

When it is desired to develop the exposures of the firm into negatives for permitting a number of pictures to be made therefrom, I make a mixture of a number of the above solutions as follows:—stock solution No. 1, by measure, 10 ounces; stock solution No. 2, by measure, 10 ounces; stock solution No. 3, by measure, 6 ounces; glycerin, by measure, 13 ounces; citric acid, 5 grains.

The solutions No. 1, No. 2, No. 3, and the glycerin are thoroughly mixed in a suitable receptacle, and in this solution is dissolved the citric acid. A strip of felt or other similar absorbent material is saturated with the mixture. The saturated strip is then wound upon a spool or the like which in turn is arranged in a camera, or like photographic apparatus in a manner so as to be disposed in contact with the sensitized film consecutively with the exposures thereof, as shown in my pending application for a patent for camera, serially numbered 778,944, filed July 14, 1913. The exposures of the film will thereby receive the direct action of the developing agents for producing negatives of the pictures without requiring the exposures to be treated by the customary processes wherein the employment of various appliances and chemicals are necessary. Thus by the use of this composition a person whether skilled or unskilled in the art of photography may conveniently produce this class of negatives.

While in the foregoing description, I have set forth the preferred formula of my composition, I do not wish to be understood as limiting myself thereto, as I am aware that any developing agent may be employed other than the agents herein mentioned, and that the proportions of the ingredients mentioned may be varied, or in instances one or more of the ingredients may be dispensed with without departing from the principle or sacrificing any of the advantages of this invention, therefore I reserve to myself the right to make such changes as fairly fall within the scope of the appended claim.

Having thus described my invention, I claim as new and desire to secure by Letters Patent:—

The herein described developing and fixing composition containing a developing agent, sodium sulfite, an alkali carbonate, sodium hyposulfite, glycerin and citric acid.

This specification signed and witnessed this sixth day of October, A. D. 1913.

FREDERICK W. HOCHSTETTER.

Witnesses:
ROBT. B. ABBOTT,
M. DERMODY.